Sept. 26, 1950     F. DE FREMERY ET AL     2,523,900
BEACON TRANSMITTER
Filed May 9, 1946
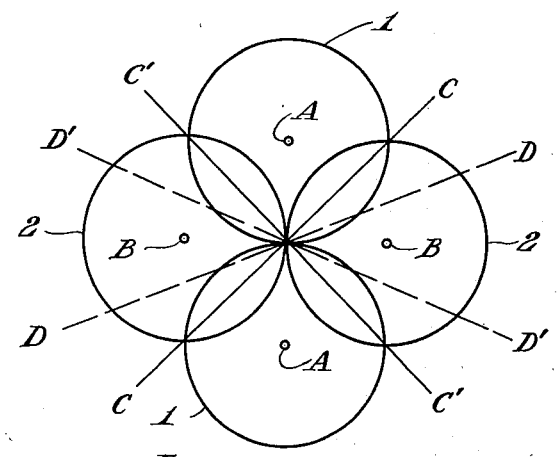
Fig. 1.
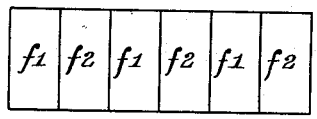
Fig. 2.
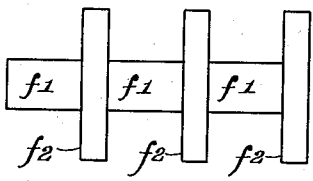
Fig. 3.
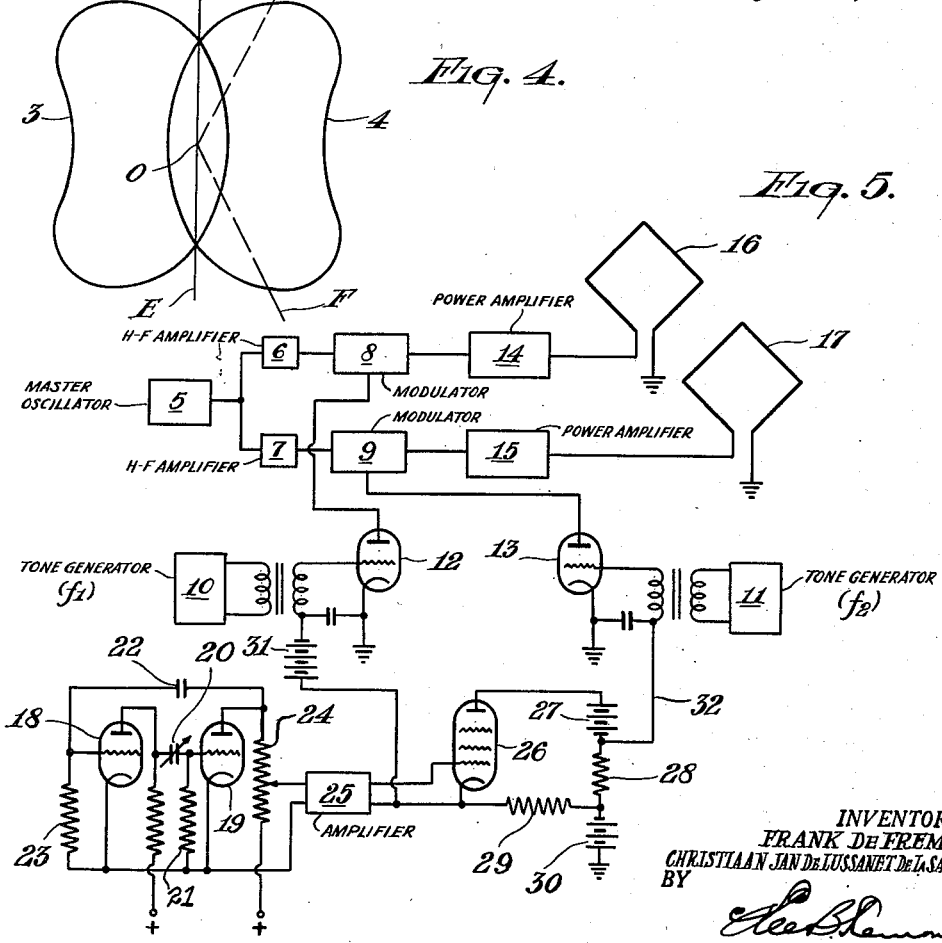
Fig. 4.
Fig. 5.
INVENTORS.
FRANK DE FREMERY.
CHRISTIAAN JAN DE LUSSANET DE LA SABLONIERE
BY
ATTORNEY.

Patented Sept. 26, 1950

2,523,900

UNITED STATES PATENT OFFICE 2,523,900

BEACON TRANSMITTER

Frank de Fremery and Christiaan Jan de Lussanet de la Sablonière, Eindhoven, Netherlands, assignors, by mesne assignments, to Hartford National Bank and Trust Company, Hartford, Conn., as trustee Application May 9, 1946, Serial No. 668,372
In the Netherlands February 18, 1942

Section 1, Public Law 690, August 8, 1946
Patent expires February 18, 1962

5 Claims. (Cl. 343—109)

This invention relates to a beacon transmitter in which two differently directed radiations overlapping each other are emitted.

A well-known example of a beacon transmitter of this kind is that in which two directive aerial systems perpendicular to each other are energised alternately. The junction line between each of the intersections of the two radiation diagrams overlapping each other and the common centre of the diagram constitutes a line of constant field strength which may serve as a course line for example for aircraft. The two radiations are generated alternately preferably in the rhythm of complementary signals, both signals being heard in the course line with equal intensity, that is to say as a continuous dash.

In a further well-known system the two radiations are generated continuously, but modulated at different frequencies and a visual guidance as to residing or not in the course line being consequently obtained by indication and comparison of the signal intensity of the two modulation frequencies.

In order to permit of obtaining at will an acoustic or optical indication of the course line it has been suggested before to provide a beacon transmitter in which the two differently directed radiations overlapping each other are modulated respectively by complementary signals and in addition at different modulation frequencies.

In practice it is often desired to be able to adjust at will the direction of the course line generated by a beacon transmitter in order to take the direction of the wind, definite obstacles on the ground or the like into account.

The invention relates to a beacon transmitter of the last mentioned kind in which the two radiations are therefore modulated by complementary signals and in addition at different modulation frequencies and it has for its object to provide means permitting of the direction of the generated course line being rendered adjustable in a simple manner.

According to the invention, means are provided to adjust the relative ratio of the duration of the complementary signals.

Changing-over is preferably effected in the rhythm of the complementary signals at such a frequency that the changing-over cannot be satisfactorily followed aurally, viz. preferably at a frequency in excess of about 50 cycles/sec. This ensures the advantage that in the receiver use may be made of moving-coil instruments of customary construction for indicating the course line, as will be explained hereinafter.

If the complementary signals are generated by means of a multi-vibrator circuit arrangement comprising two discharge tubes the anode of each of which is coupled to the grid of the other tube by means of a condenser and a resistance the relative ratio of the duration of the complementary signals is preferably adjusted by alternation of the time constants of the two resistance-condenser couplings.

In order that the invention may be clearly understood and readily carried into effect it will now be described more fully with reference to the accompanying drawings.

In the drawings:

Fig. 1 illustrates the overlapping radiation patterns of a beacon antenna system according to the invention, Fig. 2 illustrates the relative intensity of the received beacon signals in the case where the alternately radiated signals are of equal duration, Fig. 3 illustrates the relative intensity of the received beacon signals in the case where the signals are of unequal intensity, Fig. 4 illustrates the beacon course line established by the transmitter of Fig. 5, and Fig. 5 is a schematic circuit diagram of a beacon transmitter according to the invention.

Fig. 1 shows a radiation diagram capable of being generated by a beacon transmitter according to the invention. In the present case the transmitter may comprise a system of antennae AA and BB respectively which are mutually perpendicular to each other and each of which for example in known manner comprises a combination of two vertical antennae. The aerial system AA generates a radiation diagram having two loops according to the circles 1, 1, whereas the aerial system BB generates a radiation diagram comprising two loops according to the circles 2, 2 which overlap the circles 1, 1. The two aerial systems are excited alternately in the rhythm of complementary signals, whilst at the same time the radiation emitted antennae AA is modulated at a frequency $f_1$ and the radiation emitted by the antennae BB at a frequency $f_2$.

The alternate excitation of the two aerial systems is effected at a supertelegraphic frequency and is preferably in excess of about 50 cycles/sec. If the duration of the complementary signals is of equal length the course line is formed by the line on which the two modulated frequencies are received with equal intensity and hence on which the frequencies $f_1$ and $f_2$ are alternately perceived for the same length of time and with the same intensity, as is schematically represented in Fig. 2. In this case, the course line may be formed by the line CC and by the line C'C' which connect two oppositely disposed intersections of the two radiation diagrams.

If the duration of the complementary signals is chosen to be differing the course line is formed by the line on which the two modulation frequencies are perceived with the same mean strength on the assumption that the course indication is effected by means of an instrument which compares the total amount of the received energy of the frequency $f_1$ with the total amount of the received energy of the frequency $f_2$, that is by means of a meter responsive to the integral value of the received energy over a period of time. The rotary coil instruments in use are indeed too inert to follow the complementary signals and consequently indicate an average over a time which is large with the respect to the duration of the complementary signals. Since the time intervals over which the modulation frequencies $f_1$ and $f_2$ are emitted are different, the instantaneous signal strength of the two modulation frequencies will be different in the case of equal mean signal strength, as is schematically represented in Fig. 3. As shown in Fig. 3, the instantaneous signal strength of for example the frequency $f_2$ in the course line may be larger than that of the frequency $f_1$ although nevertheless as a result of the longer duration of the periods in which the frequency $f_1$ is emitted the mean signal strength of both modulation frequencies is identical. The course lines are now formed by the lines DD and D'D' of Fig. 1 which with respect to the lines CC and C'C' are rotated through the same angle but in opposite direction.

From the foregoing it is clear that variation of the relative ratio of the duration of the complementary signals permits of varying the direction of the course line in a simple manner.

With reference to the radiation diagram shown in Fig. 4 which can also be developed by means of a beacon transmitter according to the invention it can be established that by variation of the relative ratio of the duration of the complementary signals by which the two radiations which overlap each other are modulated a kinked course line can be obtained. In this case, the transmitter contains a system of two antennae each of which develops a radiation diagram 3 or 4 respectively formed by only one loop and which are excited in the rhythm of complementary signals, while at the same time the radiations emitted by the antennae are modulated as the frequencies $f_1$ and $f_2$ respectively.

If with such a beacon transmitter the time interval during which the modulation signal $f_1$ is emitted is equal in duration to that in which the modulation signal $f_2$ is emitted, the course line is formed by the line EE which connects the intersections of the two radiation diagrams.

If the duration is chosen to be differing the course line may be represented by the kinked line FOF if the time interval over which the frequency $f_1$ is emitted is so much longer than the time interval over which the modulation frequency $f_2$ is emitted that along this line the two modulation frequencies are perceived with the same mean intensity.

One form of construction of a beacon transmitter according to the invention is shown in Fig. 5.

The oscillations generated by a master oscillator 5 are fed over amplifiers 6 and 7 to modulators 8 and 9 which are coupled respectively to tone generators 10 and 11 by which the modulation frequencies $f_1$ and $f_2$ are generated. The oscillations generated by the tone generator 10 at the frequency $f_1$ are fed over an amplifier valve 12 to the modulator 8 with the result that the oscillations generated by the control transmitter 5 are modulated in the modulator 8 at the frequency $f_1$ and the oscillations generated by the tone generator 11 are fed at the frequency $f_2$ over an amplifier valve 13 to the modulator 9 with the result that the oscillations received from the master oscillator 5 are modulated at a frequency $f_2$ in the modulator 9. The output energy of the modulator 8 is fed over an amplifier 14 to a loop antennae 16, whereas the output energy of the modulator 9 is delivered over an amplifier 15 to a loop antenna 17. By means of two loop antennae normal to each other a radiation diagram as shown in Fig. 1 is developed.

The amplifier valves 12 and 13 are alternately in use so that the modulation frequencies $f_1$ and $f_2$ are supplied to the modulators 8 and 9 alternately and for this purpose the tubes 12 and 13 are controlled by means of complementary signals generated by a multi-vibrator.

The said multi-vibrator comprises two discharge tubes 18 and 19, the anode of the tube 18 being coupled over a condenser 20 and a resistance 21 to the grid of the tube 19, whereas the anode of the tube 19 is coupled over the condenser 22 and the resistance 23 to the grid of the tube 18. The tubes 18 and 19 generate pulses in known manner and these pulses are taken off the output-resistance 24 of the tube 19 and fed via an amplifier 25 to the control grid of a discharge tube 26, the arrangement being such that during the occurrence of a pulse the tube 26 is conductive, whereas in the interval between two pulses it is non-conductive.

The anode circuit of the tube 26 includes a battery 27 whose positive terminal is connected to the anode and two resistances 28 and 29. The point of connection between the resistances 28 and 29 is connected to the negative terminal of a battery 30 whose positive terminal is earthed, whereas the cathode of the tube 26 is connected to the positive terminal of a battery 31 whose negative terminal is connected to the control grid of the tube 12. The control grid of the tube 13 is connected over a conductor 32 to the point of connection between the battery 27 and the resistance 28.

The operation of the circuit arrangement described is as follows. When the tube 26 is blocked the negative bias of the tube 12 is governed by the joint voltage of the batteries 30 and 31, whereas the negative bias of the control grid of the tube 13 is solely governed by the battery 30. Under these conditions the tube 12 is non-conductive and the tube 13 conductive so that solely the antenna 17 is excited.

When the tube 26 is conductive the resistances 28 and 29 have passing through them a current by which such a voltage drop is brought about across the resistance 29 that the tube 12 is rendered conductive, whereas such a voltage drop is set up across the resistance 28 that the tube 13 is rendered non-conductive. In this case, solely the antenna 16 is excited.

From the foregoing it is clear that the antenna 16 is energised during the occurrence of the pulses and the antenna 17 during the interval between two pulses. The pulses and the intervals occurring between them constitute complementary signals so that the antennae 16 and 17 are alternately energised in synchronism with these complementary signals. The generated pulses preferably have a frequency in excess of the signal speeds customary in telegraphy.

According to the invention, the ratio of the duration of the complementary signals or in other words the ratio between the duration of a pulse and the duration of the interval of two pulses is made adjustable. This may be effected, for example, by regulating the time constants of the circuits 20, 21 and 22, 23 and for this purpose in the form of construction shown in the figure the condensers 20 and 22 are made adjustable. By a variation of the capacities of the condensers 20 and 22 it is thus possible to adjust at will the direction of the course line governed by the antennae 16 and 17.

We claim:

1. A radio beacon system comprising a pair of antennas arranged to form overlapping radiation patterns, means alternately to excite said antennas with modulated radio frequency energy, the modulation frequencies of said antennas being different to produce distinguishing signal characteristics, and means to adjust the ratio of the respective periods during which said antennas are alternately energized.

2. A radio beacon system comprising a pair of antennas arranged to form overlapping radiation patterns, means alternately to excite said antennas with modulated radio frequency energy, the modulation frequencies of said antennas being different to produce distinguishing signal characteristics, said antennas being alternately energized at a rate exceeding 50 cycles per second, and means to adjust the ratio of the respective periods during which said antennas are alternately energized.

3. A radio beacon system comprising a pair of antennas arranged to form overlapping radiation patterns, a common source of radio frequency carrier energy for said antennas, first and second modulation means coupling said carrier source to the respective antennas, first and second low-frequency oscillators to produce different modulation frequencies for said antennas, first and second amplifiers coupling said oscillators respectively to said first and said modulation means, means for alternately disabling said amplifiers whereby said antennas are alternately energized with modulated radio frequency energy, and means for adjusting the relative periods during which said amplifiers are alternately disabled.

4. A radio beacon system comprising a pair of antennas arranged to form overlapping radiation patterns, a common source of radio frequency carrier energy for said antennas, first and second modulation means coupling said carrier source to the respective antennas, first and second low-frequency oscillators to produce different modulation frequencies for said antennas, first and second amplifiers for coupling said oscillators respectively to said first and second modulation means, a multivibrator for generating a rectangular wave, means to apply said rectangular wave in phase opposition to said first and second amplifiers to alternately disable same, and means to adjust the symmetry of said multivibrator thereby to control the relative periods during which said amplifiers are alternately disabled.

5. An arrangement as set forth in claim 4 wherein said multivibrator operates at a frequency exceeding 50 cycles a second.

FRANK DE FREMERY.
CHRISTIAAN JAN DE LUSSANET
DE LA SABLONIÈRE.

REFERENCES CITED

The following references are of record in the file of this patent:

UNITED STATES PATENTS

| Number | Name | Date |
| --- | --- | --- |
| 1,910,427 | Diamond | May 23, 1933 |
| 2,072,962 | Plebanski | Mar. 9, 1937 |
| 2,189,317 | Koch | Feb. 6, 1940 |
| 2,234,828 | Luck | Mar. 11, 1941 |
| 2,279,031 | Cockerell | Apr. 7, 1942 |
| 2,288,196 | Kramar | June 30, 1942 |
| 2,300,999 | Williais | Nov. 3, 1942 |
| 2,307,184 | Alford | June 5, 1943 |
| 2,356,071 | MacDonald et al. | Aug. 15, 1944 |
| 2,407,323 | O'Brien | Sept. 10, 1946 |
| 2,419,525 | Alford | Apr. 29, 1947 |
| 2,419,984 | Boothroyd | May 6, 1947 |